US008533678B2

(12) United States Patent
Halter et al.

(10) Patent No.: US 8,533,678 B2
(45) Date of Patent: Sep. 10, 2013

(54) EMBEDDED DEVICE PROGRAM DEBUG CONTROL

(75) Inventors: Steven L. Halter, Rochester, MN (US);
Adam D. Dirstine, Rochester, MN (US);
David J. Hutchison, Rochester, MN (US);
Pamela A. Wright, Rochester, MN (US);
Jeffrey M. Ryan, Byron, MN (US);
Charles H. Gordon, Ashland, MA (US)

(73) Assignee: Digi International Inc., Minnetonka, MN (US)

( * ) Notice: Subject to any disclaimer, the term of this patent is extended or adjusted under 35 U.S.C. 154(b) by 1352 days.

(21) Appl. No.: 11/777,882

(22) Filed: Jul. 13, 2007

(65) Prior Publication Data

US 2009/0019270 A1    Jan. 15, 2009

(51) Int. Cl.
*G06F 9/44* (2006.01)
*G06F 9/45* (2006.01)

(52) U.S. Cl.
USPC ........... 717/124; 717/125; 717/127; 717/140; 712/227

(58) Field of Classification Search
None
See application file for complete search history.

(56) References Cited

U.S. PATENT DOCUMENTS

| | | | |
|---|---|---|---|
| 6,834,360 B2 | 12/2004 | Corti et al. | |
| 7,559,055 B2* | 7/2009 | Yang et al. | 717/127 |
| 7,584,456 B1* | 9/2009 | Veenstra et al. | 717/124 |
| 2002/0013893 A1* | 1/2002 | Roy et al. | 712/227 |
| 2002/0059054 A1 | 5/2002 | Bade et al. | |
| 2002/0065646 A1 | 5/2002 | Waldie et al. | |
| 2002/0144235 A1* | 10/2002 | Simmers et al. | 717/124 |
| 2003/0028858 A1* | 2/2003 | Hines | 717/125 |
| 2003/0074650 A1 | 4/2003 | Akgul et al. | |
| 2007/0006154 A1* | 1/2007 | Yang et al. | 717/124 |
| 2007/0011334 A1 | 1/2007 | Higgins et al. | |
| 2007/0220499 A1* | 9/2007 | Bannatyne et al. | 717/140 |
| 2007/0234294 A1* | 10/2007 | Gooding | 717/124 |
| 2008/0222612 A1* | 9/2008 | Glotzbach et al. | 717/127 |

FOREIGN PATENT DOCUMENTS

EP    0 943 995 A3    9/1999

OTHER PUBLICATIONS

Burgess, P., et al., Debugging and Dynamic Modification of Embedded Systems, Proceedings of the 29th Annual Hawaii International Conference on System Sciences, IEEE, 1996, pp. 489-498, [retrieved on Jul. 11, 2013], Retrieved from the Internet: <URL:http://ieeexplore.ieee.org/>.*
Hand, T., Debugging Embedded Systems Implemented in C, Proceedings of the second and third annual workshops on Forth, 1991, pp. 17-22, [retrieved on Jul. 11, 2013], Retrieved from the Internet: <URL:http://dl.acm.org/>.*

* cited by examiner

*Primary Examiner* — Tuan Q. Dam
*Assistant Examiner* — Geoffrey St Leger
(74) *Attorney, Agent, or Firm* — Fogg & Powers LLC

(57) ABSTRACT

An embedded processor system includes an integrated development environment and an embedded processor operating system. The embedded processor operating system is operable to run on the embedded processor system, and a command queue is operable to receive commands from a debugging module external to the embedded processor system. A command queue processing module is operable to change settings in the embedded processor system in response to commands in the command queue.

18 Claims, 6 Drawing Sheets

```
/*
 * The following symbols are defined in the linker scripts. Note that the
 * linker script sets an address. So the relevant value in
 _naDebuggerCommandAreaAddress
 * is its address, not its contents.
 */
extern char _naDebuggerCommandAreaAddress[];
extern char _naDebuggerCommandAreaLength[];
```

FIG. 1

```
/*
 * This structure defines the structure of the entire command buffer.
 */
typedef struct
{
   char signature[sizeof DCMD_SIGNATURE];
   unsigned numberOfCommands;
   NADcmdCommand_t command[];
} NADcmdBuffer_t;

/*
 * The signature field in NADcmdArea must be set to this value, or the command
 * buffer will be ignored.
 */
#define DCMD_SIGNATURE  "DCMD Signature"
```

FIG. 2

```
/*
 * This structure defines a single command.
 */
typedef struct
{
    WORD32 command;      /* must be set to one of the DCMD_CMD_* values */
    WORD32 status;       /* must be set to one of the DCMD_STATUS_* values */
    WORD32 errorCode;    /* command specific error code */
    WORD32 dataOffset;   /* offset of additional command data in NADcmdBuffer */
    WORD32 dataLength;   /* length of additional command data in NADcmdBuffer, set to 0 if none */
} NADcmdCommand_t;

/*
 * Possible values for the status field in NADcmdCommand_t.
 */
#define DCMD_STATUS_TODO       (0)   /* command has not been executed yet */
#define DCMD_STATUS_COMPLETED  (1)   /* command has been successfully completed */
#define DCMD_STATUS_FAILED     (2)   /* command did not complete successfully */
```

FIG. 3

```
/*
 * This command resets the unit to factory default values.
 */
#define DCMD_CMD_RESET_TO_FACTORY_DEFAULTS    (0)

/*
 * This command sets the unit's Ethernet MAC address.  Set dataOffset to indicate the
 * start of the MAC address and dataLength to 6.
 */
#define DCMD_CMD_SET_ETHERNET_MAC_ADDRESS     (1)

/*
 * This command sets the unit's Wireless MAC address.  Set dataOffset to indicate the
 * start of the MAC address and dataLength to 6.
 */
#define DCMD_CMD_SET_WIRELESS_MAC_ADDRESS     (2)
```

FIG. 4

```
# Internal use only: IDE command
# Allocates an IDE debugger command from the IDE/Debugger command area
# Returns: $nextIdeCmd - pointing to the allocated command block
(NADcmdCommand_t *)

define allocateIdeCommand
   set $signature = &((NADcmdBuffer_t *)_naDebuggerCommandAreaAddress)->signature
   if ($signature[0] != 'D')
      # Initialize the IDE/debugger command area on first touch
      set var (char[]) ((NADcmdBuffer_t *)_naDebuggerCommandAreaAddress)->signature = "DCMD Signature"
      set var ((NADcmdBuffer_t *)_naDebuggerCommandAreaAddress)->numberOfCommands = 0
      # Record some helper variables
      set var $dcmdListPtr = ((NADcmdBuffer_t *)_naDebuggerCommandAreaAddress)->command
      set var $dcmdNumPtr = &((NADcmdBuffer_t *)_naDebuggerCommandAreaAddress)->numberOfCommands
   end
   # Now allocate the next available command slot to the caller and
return him a pointer to it
   set var $nextIdeCmd = &$dcmdListPtr[*$dcmdNumPtr]
   set var *$dcmdNumPtr = *$dcmdNumPtr + 1
end

# Issue command to reset the device to factory defaults on boot
# This command must be ran after downloading the image but before
starting execution.

define resetToDefaults
   allocateIdeCommand
   set var $nextIdeCmd->command = 0
   set var $nextIdeCmd->status = 0
   set var $nextIdeCmd->errorCode = 0
   set var $nextIdeCmd->dataOffset = 0
   set var $nextIdeCmd->dataLength = 0
end
```

FIG. 5

EMBEDDED DEVICE PROGRAM DEBUG CONTROL

FIELD OF THE INVENTION

The invention relates generally to debugging software, and more specifically to controlling an embedded device while debugging an embedded device program.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized devices often use similar processors and circuits to perform different tasks, relying on the general-purpose nature of many processors to provide a relatively inexpensive and fast means to produce a specialized computerized device. Some processors are specifically designed to be embedded in customized applications, and include a wide variety of features such as analog and digital inputs and outputs, network support, and specialized software libraries supporting such features to make software design for such systems relatively easy.

Some such systems are called embedded systems, reflecting that a processor or computerized system is embedded in the system to perform a specific task, which distinguishes an embedded system from a general-purpose computer that usually lacks the software and hardware configured to perform one or more specific tasks in a specific embedded environment. Examples of embedded systems include controllers for industrial processes, remote monitoring and sensing systems, as well as handheld devices such as cell phones and personal digital assistants. Although some of these devices such as personal digital assistants often include general-purpose software execution among their features, their construction and configuration resembles that of traditional embedded system devices and so they are often considered embedded systems.

Embedded systems can also often be customized to a greater extent than general-purpose computers, discarding hardware components and software drivers not used in a specific application of an embedded system. Embedded processor providers typically provide support for a variety of hardware through very robust software packages supporting a variety of different configurations, such as USB, analog, network, serial, analog-to digital, digital-to-analog, and other interfaces.

Software designed to execute on embedded systems therefore often use a variety of hardware settings in addition to software configuration settings and other parameters to control operation of certain parts of the program. For example, an embedded processor coupled to a network may use hardware settings including an Internet Protocol (IP) address, encryption keys, and other network configuration settings to communicate with other computerized systems. Changing these settings can change how the software operates, and which software instructions are executed. It is therefore desired to manage such settings while debugging embedded software.

SUMMARY

One example embodiment of the invention comprises an embedded processor system including an integrated development environment and an embedded processor system operating system. The operating system is operable to run on the embedded processor system, and a command queue is operable to receive commands from a debugging module external to the embedded processor system. A command queue processing module is operable to change settings in the embedded processor in response to commands in the command queue.

BRIEF DESCRIPTION OF THE FIGURES

FIG. 1 illustrates an example structure defining a command queue, consistent with an example embodiment of the invention.

FIG. 2 illustrates a command queue structure, consistent with an example embodiment of the invention.

FIG. 3 illustrates a command, consistent with an example embodiment of the invention.

FIG. 4 illustrates a variety of commands used to control features of a real-time operating system provided with the embedded system, consistent with an example embodiment of the invention.

FIG. 5 illustrates an IDE debugger script used to populate a command queue, consistent with an example embodiment of the invention.

DETAILED DESCRIPTION

Figure 6:
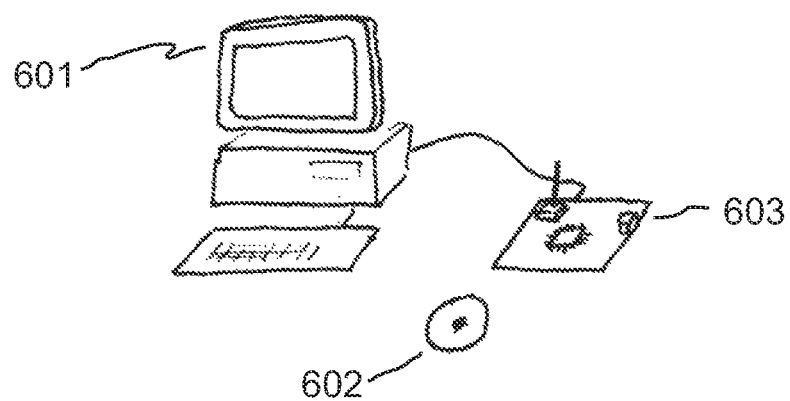
FIG. 6 is an example embedded processor system coupled to an external computer system including an Integrated Development Environment, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

The invention provides in one example embodiment an embedded processor system including an integrated development environment and an embedded processor system operating system. The operating system is operable to run on the embedded processor system, and a command queue is operable to receive commands from a debugging module external to the embedded processor system. A command queue processing module is operable to change settings in the embedded processor in response to commands in the command queue. Embedded systems including processors and associated hardware configured to perform a specific function are used to make a variety of common devices, including medical devices, aviation instrumentation, home automation products, communications devices such as routers, handheld computers such as personal digital assistants and cell phones, video game systems, industrial control systems, automotive computers, and a wide variety of other such computerized devices.

Although many of these systems could be easily built using the same embedded processor, the software and operating system configuration of the system and the hardware around the processor will likely differ from application to application. A router, for example, will likely have several wired network ports configured with IP addresses and other configuration settings, but will not have wireless network capability or wireless encryption settings. An industrial controller might have a variety of analog-to-digital converter inputs to digitize analog signals being sensed, and provide control output via a digital-to-analog converter, but may not include any network functionality or USB ports.

Design of embedded systems such as these typically involves use of a prototype or evaluation circuit board having the desired hardware incorporated into the circuit, along with an integrated development environment (IDE) including software support for a wide variety of hardware devices that are supported by the embedded processor provider. The IDE typically includes a source code editor and a compiler, as well as a variety of libraries of functions to provide easier programmer interface to various hardware elements such as networking, USB, and other interfaces. The program segments are sometimes provided as part of what is known as a software development kit (SDK), which can include application programming interface (API), dynamic linked library (DLL), and other support for referencing external software or system services from a computer program. This makes it easier for a programmer to quickly and efficiently write software that uses a variety of different hardware components, without having to learn or program common functions of the various hardware components.

Many of the settings and configuration options in an embedded system are stored in nonvolatile storage such as a hard disk drive or flash memory, and are loaded upon program execution. Examples include the IP address of a network interface, wireless network settings such as network ID and encryption settings, interrupt or direct memory access (DMA) settings, operating system configuration, controller coefficients, and other such settings. These settings affect operation of the embedded system, and different settings can result in different program code being executed in a different way. Debugging program code on an embedded system is therefore somewhat difficult in that these settings cannot be easily controlled during execution, except by using tools external to the Integrated Development Environment such as a telnet session to access the embedded system and change settings between debugging runs.

Tools to change such settings are therefore not usually available during a typical embedded controller software debug session, and the programmer is therefore not able to fully control the embedded device during debug. In some debugging scenarios, altering one or more of these settings to alter program operation would be useful to locate and fix a program bug. Although these settings can be changed in some examples by statically specifying settings such as the embedded device IP address, some instructions will be bypassed or executed differently as a result, potentially hiding bugs that remain in the production code. Also, specifying settings in software code would not allow an end user the ability to configure these settings, making the embedded system less useful or adaptable to different environments.

These and other problems are addressed in some embodiments of the invention by use of a command queue which is exposed to the Integrated Development Environment via the memory of the embedded controller while debugging an executing program on the remote embedded system. When the embedded system boots, it acts on the commands that the Integrated Development Environment has placed in the queue, using special code that is outside the normal executed code that is being debugged. Because the settings are configured in the embedded device during operation but external to the code being debugged, the embedded system executes the same code path as would be executed during normal operation, such as where the embedded system uses a particular configuration set stored in nonvolatile memory.

The programmer using the Integrated Development Environment therefore has the ability to modify the operation of the embedded system by changing the various settings via the command queue, without modifying either the firmware or the program being debugged in the embedded system. The normal program execution path is followed, and the developer does not have to leave the Integrated Development Environment such as to initiate a telnet session.

The command queue parses debug commands specifying various settings for the embedded system, and enables the developer to pass the commands to an embedded system external to the Integrated Development Environment's system. The developer can therefore initiate board operation and program execution normally, and can do normal setup, break, register, and other functions during debug. There is no need for the developer to leave the Integrated Development Environment during debug to set or reconfigure the various settings, enabling easier debugging of the embedded system. The Integrated Development Environment in a further embodiment is operable to store various settings, and to use the stored configurations for reboots and retrys during debug as well as for board verification and test.

Command queue instructions include in various embodiments not only configuration or other settings, but include other debugging commands such as rerouting an input/output stream through the command queue so that a debug session can readily access the data stream. Any other commands that may help with the debugging process may be utilized in further embodiments.

FIG. 1 illustrates an example structure defining a command queue, consistent with an example embodiment of the invention. The _naDebuggerCommandAreaAddress is a symbol used to represent the starting address of the command queue area in memory, and the _naDebuggerCommandAreaLength is a symbol used to represent the length of the command queue area in memory. These symbols therefore define the position and size of the command queue in the embedded system's memory, which will be used to hold encoded commands.

FIG. 2 illustrates a command queue structure, consistent with an example embodiment of the invention. The signature in this example must be set to a known constant for commands to be accepted and executed. In this example, the signature "DCMD Signature" indicates that the information in memory is a legitimate command, and is not random or corrupt data that does not contain a command. A number of commands in the array is also specified by the numberOfCommands symbol.

FIG. 3 illustrates a command, consistent with an example embodiment of the invention. The command structure shown includes a command field that must be set to one of a number of valid command codes, and a status symbol that must be set to a known status state such as "DCMD_STATUS_TODO". When a command is completed, the status symbol is changed to "DCMD_STATUS_COMPLETED" or "DCMD_STATUS_FAILED" to indicate whether the command was completed successfully or failed. Some commands require additional data, such as a value to be set or other such data, and use the dataOffset and dataLength variables to identify the data in the command structure.

FIG. 4 illustrates a variety of commands used to control features of a real-time operating system provided with the embedded system, consistent with an example embodiment of the invention. The first example is a command which is used to restore all settings in the embedded system's operating system to factory defaults. The second and third examples illustrate commands used to set a MAC address of a network interface, for both Ethernet and wireless networks. The dataOffset variable is set to indicate the start of the MAC address data, and the dataLength is set to six bytes.

FIG. 5 illustrates an IDE debugger script used to populate a command queue, consistent with an example embodiment of the invention. The script shown here is a gdb script that is used during remote debugging to add commands to the command queue of the real-time operating system running on the embedded system. The commands are processed on the embedded system, and the status of the commands are updated after they are executed.

FIG. 6 shows a system, comprising a personal computer 601, a machine-readable medium 602, and an embedded processor system 603. The machine-readable medium 602 is in some examples a compact disc or DVD, and is used to install an Integrated Development Environment (IDE) and other software onto personal computer 601. A software project is typically produced in the IDE, where it is written, compiled, and debugged before being loaded from the development environment on the personal computer onto the embedded processor system 603. The personal computer 601 is then operable to run the installed Integrated Development Environment, to compile software developed in the IDE, and to send data from the IDE to the command queue of the embedded system for configuring settings during debugging.

This approach has the advantage that the Integrated Development Environment is more user-friendly, and the user does not need to leave the Integrated Development Environment to make configuration changes or choices while debugging software on the embedded system. The execution path of the software on the embedded system remains the same as it would during normal operation, eliminating the risks involved with changing the behavior of the firmware or in hard-coding configuration settings. Because the same firmware can be used during debugging and actual program execution, risks associated with managing different versions of firmware are also reduced.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

We claim:

1. An embedded processor operating system, comprising:
an embedded processor system, wherein the embedded processor system executes embedded system program code during normal operation;
an operating system operable to run on the embedded processor system;
a command queue stored in memory of the embedded processor system, wherein the command queue is operable to receive commands from a debugging module external to the embedded processor system;
a command queue processing module operable to change configuration settings in the embedded processor system in response to commands in the command queue, the configuration settings comprising settings that change parameters of the environment in which the embedded system program code is being debugged, wherein the command queue processing module configures the parameters during operation of the embedded processor system such that the embedded processor system, while being debugged, executes the same code path executed during normal operation;
wherein the command queue processing module is further operable to perform debugging commands in response to commands in the command queue, wherein the debugging commands include rerouting at least one of an input data stream and an output data stream through the command queue so that a debug session can readily access the at least one of the input data stream and the output data stream; and
wherein the configuration settings include at least one of hardware configuration settings, network configuration settings, software configuration settings, operating system configuration settings, input data stream routing settings, and output data stream routing settings.

2. The embedded processor operating system of claim 1, wherein the debugging module is an Integrated Development Environment running on a computer system external to the embedded processor system operable to control execution of the embedded system program code being debugged.

3. The embedded processor operating system of claim 1, wherein the command queue comprises a specified section of memory in the embedded processor system.

4. The embedded processor operating system of claim 1, wherein the command queue processing module is operable to send results from execution of the commands to the external debugging module.

5. The embedded processor operating system of claim 1, wherein the network configuration settings include at least one of an Internet Protocol (IP) addresses of a network interface, wireless network settings, a network ID, and encryption settings; and
wherein the hardware configuration settings include at least one of interrupt settings, direct memory access (DMA) settings, and controller coefficients.

6. An Integrated Development Environment (IDE), comprising:
a first computerized system;
a debugger executing on the first computerized system operable to control execution of embedded system program code being debugged;
a command queue in an embedded processor system operable to receive commands from the debugger executing on the first computerized system;
a command queue processing module operable to send commands to the embedded processor system attached to the first computerized system, the commands operable when executed in the embedded processor system to change configuration settings in the embedded processor system during debugging in response to commands in the command queue, the configuration settings comprising settings that change parameters of the environment in which embedded system program code is being debugged, wherein the command queue processing module configures the parameters during operation of the embedded processor system such that the embedded processor system, while being debugged, executes the same code path through the embedded system program code that is executed during normal operation;

wherein the command queue processing module is further operable to perform debugging commands in response to commands in the command queue, wherein the debugging commands include rerouting at least one of an input data stream and an output data stream through the command queue so that a debug session can readily access the at least one of the input data stream and the output data stream; and wherein the configuration settings include at least one of hardware configuration settings, network configuration settings, software configuration settings, operating system configuration settings, input data stream routing settings, and output data stream routing settings.

7. The Integrated Development Environment of claim 6, wherein the command queue comprises a specified section of memory in the embedded processor system.

8. The Integrated Development Environment of claim 6, wherein the command queue processing module is further operable to send results from execution of the commands to the external debugging module.

9. The Integrated Development Environment of claim 6, wherein the network configuration settings include at least one of an Internet Protocol (IP) addresses of a network interface, wireless network settings, a network ID, and encryption settings; and wherein the hardware configuration settings include at least one of interrupt settings, direct memory access (DMA) settings, and controller coefficients.

10. A method of managing configuration settings in an embedded processor system during debugging, comprising:

executing an Integrated Development Environment comprising a debugger operable to control execution of embedded system program code being debugged on a first computerized system, the Integrated Development Environment operable to send commands to the embedded processor system;

receiving the commands sent from the Integrated Development Environment in a command queue in the embedded processor system;

processing the commands on the embedded processor system, the commands operable when executed to change configuration settings in the embedded processor system during debugging, the configuration settings comprising settings that change parameters of the environment in which the embedded system program code is being debugged, wherein the command queue processing module configures the parameters during operation of the embedded processor system such that the embedded processor system, while being debugged, executes the same code path executed during normal operation;

wherein the command queue processing module is further operable to perform debugging commands in response to commands in the command queue, wherein the debugging commands include rerouting at least one of an input data stream and an output data stream through the command queue so that a debug session can readily access the at least one of the input data stream and the output data stream; and wherein the configuration settings include at least one of hardware configuration settings, network configuration settings, software configuration settings, operating system configuration settings, input data stream routing settings, and output data stream routing settings.

11. The method of managing configuration settings in an embedded processor system during debugging of claim 10, wherein the command queue comprises a specified section of memory in the embedded processor system.

12. The method of managing configuration settings in an embedded processor system during debugging of claim 10, wherein processing the commands on the embedded processor system comprises executing commands in the command queue.

13. The method of managing configuration settings in an embedded processor system during debugging of claim 10, further comprising sending results from processing the commands to the Integrated Development Environment executing on the first computerized system.

14. The method of managing configuration settings in an embedded processor system during debugging of claim 10, wherein the network configuration settings include at least one of an Internet Protocol (IP) addresses of a network interface, wireless network settings, a network ID, and encryption settings; and wherein the hardware configuration settings include at least one of interrupt settings, direct memory access (DMA) settings, and controller coefficients.

15. A data structure encoded on a non-transitory machine-readable medium, comprising:

a command queue operable to receive instructions from a debugging module executing on an external computerized system, the command queue operable to store commands that are operable when executed to change one or more configuration settings in an embedded processor system, the configuration settings comprising settings that change parameters of the environment in which the embedded system program code is being debugged, wherein the command queue processing module configures the parameters during operation of the embedded processor system such that the embedded processor system, while being debugged, executes the same code path executed during normal operation;

wherein the command queue processing module is further operable to perform debugging commands in response to commands in the command queue, wherein the debugging commands include rerouting at least one of an input data stream and an output data stream through the command queue so that a debug session can readily access the at least one of the input data stream and the output data stream; and wherein the configuration settings include at least one of hardware configuration settings, network configuration settings, software configuration settings, operating system configuration settings, input data stream routing settings, and output data stream routing settings.

16. The data structure of claim 15, wherein the network configuration settings include at least one of an Internet Protocol (IP) addresses of a network interface, wireless network settings, a network ID, and encryption settings; and wherein the hardware configuration settings include at least one of interrupt settings, direct memory access (DMA) settings, and controller coefficients.

17. An embedded processor system kit, comprising:
an embedded processor circuit;
an Integrated Development Environment; and
an operating system executable in the embedded processor circuit comprising a command queue operable to receive commands from a debugging module operable to control execution of embedded system program code being debugged external to the embedded processor circuit and a command queue processing module operable to change configuration settings in the embedded processor circuit in response to commands in the command queue, the configuration settings comprising settings that change parameters of the environment in which the embedded system program code is being debugged, wherein the command queue processing module configures the parameters during operation of the embedded processor circuit such that the embedded processor circuit, while being debugged, executes the same code path executed during normal operation;

wherein the command queue processing module is further operable to perform debugging commands in response to commands in the command queue, wherein the debugging commands include rerouting at least one of an input data stream and an output data stream through the command queue so that a debug session can readily access the at least one of the input data stream and the output data stream; and wherein the configuration settings include at least one of hardware configuration settings, network configuration settings, software configuration settings, operating system configuration settings, input data stream routing settings, and output data stream routing settings.

18. The embedded processor system kit of claim 17, wherein the network configuration settings include at least one of an Internet Protocol (IP) addresses of a network interface, wireless network settings, a network ID, and encryption settings; and wherein the hardware configuration settings include at least one of interrupt settings, direct memory access (DMA) settings, and controller coefficients.

* * * * *